US008810947B1

(12) United States Patent  (10) Patent No.: US 8,810,947 B1
Ren et al.  (45) Date of Patent: Aug. 19, 2014

(54) RECESSING A NEAR FIELD TRANSDUCER IN A HEAT-ASSISTED MAGNETIC RECORDING HEAD

(71) Applicant: HGST Netherlands B.V., Amsterdam (NL)

(72) Inventors: Shen Ren, Union City, CA (US); Erhard Schreck, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/906,106

(22) Filed: May 30, 2013

(51) Int. Cl.
    *G11B 5/02* (2006.01)
(52) U.S. Cl.
    USPC .................................................. 360/59
(58) Field of Classification Search
    CPC .............................................. G11B 2005/0005
    USPC .......... 360/59, 123.12; 369/13.33; 29/603.08, 29/603.16, 603.07; 451/5, 7, 8, 53
    See application file for complete search history.

(56) References Cited

U.S. PATENT DOCUMENTS

| 7,974,046 B2 | 7/2011 | Ota et al. | |
| 8,077,418 B1 * | 12/2011 | Hu et al. | 360/59 |
| 8,248,891 B2 | 8/2012 | Lee et al. | |
| 8,264,919 B2 | 9/2012 | Komura et al. | |
| 8,335,053 B2 | 12/2012 | Chen et al. | |
| 8,351,151 B2 | 1/2013 | Katine et al. | |
| 2010/0309581 A1 * | 12/2010 | Wu et al. | 360/123.12 |
| 2011/0128828 A1 | 6/2011 | Naniwa et al. | |
| 2011/0205863 A1 | 8/2011 | Zhao et al. | |
| 2011/0286127 A1 | 11/2011 | Gao et al. | |
| 2011/0299367 A1 | 12/2011 | Naniwa et al. | |
| 2012/0275280 A1 | 11/2012 | Miyauchi et al. | |

OTHER PUBLICATIONS

Kyoung-Su Park et al., "Thermal protrusion of thermally assisted magnetic recording for binary gas mixture with temperature", IEEE Xplore Digital Library, Published in APMRC 2012 Digest, pp. 1-2, URL: http://ieeexplore.ieee.org/stamp/stamp.jsp?tp=&arnumber=6407551&isnumber=6401675.

Baoxi Xu et al., "Dynamic Thermal Responses of Heat-Assisted Magnetic Recording Head in Data Writing Process", IEEE Transactions on Magnetics, vol. 48, No. 11, Nov. 2012, pp. 3280-3283, URL: http://ieeexplore.ieee.org/stamp/stamp.jsp?tp=&arnumber=6333004&isnumber=6332554.

* cited by examiner

*Primary Examiner* — Nabil Hindi
(74) *Attorney, Agent, or Firm* — John D. Henkhaus (57) ABSTRACT

A recessed near field transducer (NFT) in a heat-assisted magnetic recording head is manufactured by applying Joule heating to the slider to induce a protrusion of materials of and around the NFT and, while applying the Joule heating, removing the protrusion by lapping the slider. Removing the induced protrusion in this manner causes the NFT to recess into the body of the slider at ambient temperature, whereby during HAMR operation when optical power is being applied to a disk via the NFT, the NFT is substantially flush with the slider air bearing surface.

12 Claims, 6 Drawing Sheets

RECESSING A NEAR FIELD TRANSDUCER IN A HEAT-ASSISTED MAGNETIC RECORDING HEAD

FIELD OF EMBODIMENTS OF THE INVENTION

Embodiments of the invention relate generally to hard disk drives and more particularly to a method and apparatus for a recessed near field transducer in a heat-assisted magnetic recording head.

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates.

Increasing areal density (a measure of the quantity of information bits that can be stored on a given area of disk surface) is one of the ever-present holy grails of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) [forms of which may also be referred to as energy-assisted magnetic recording (EAMR) or thermal-assisted magnetic recording (TAR)] is a known technology that magnetically records data on high-stability media using, for example, laser thermal assistance to first heat the material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature above the Curie temperature, at which the medium effectively loses coercivity and a realistically achievable magnetic write field can write data to the medium.

One approach to HAMR designs is to utilize a semiconductor laser system to heat the media to lower its coercivity, whereby the optical energy is transported from the laser to the slider ABS via a waveguide and is concentrated to a nanometer-sized spot utilizing a near field transducer (NFT). However, some of the optical energy provided to the NFT is absorbed by the materials in and surrounding the NFT, and heat-induced protrusion of the NFT and the surrounding materials may occur. Therefore, the metal(s) used for the NFT may protrude into the media under the optical excitation during HAMR writing and, because such metal (e.g., Au) is typically mechanically soft, the NFT protrusion can result in mechanical damage to the NFT and ultimately possible head failure.

SUMMARY OF EMBODIMENTS OF THE INVENTION

Embodiments of the invention are directed towards a recessed near field transducer in a heat-assisted magnetic recording head for use in a hard disk drive, and a method of manufacturing the same.

According to an embodiment, a near field transducer (NFT) and possibly surrounding material of a heat-assisted magnetic recording (HAMR) head slider is caused to protrude by applying Joule heating to the slider. For example, electrical current is applied to a heater element near the NFT. Further, while applying the Joule heating, the protrusion is removed by lapping the head slider. Removing the protrusion in this manner causes the NFT to recess into the body of the slider at ambient temperature, whereby the extent to which the NFT recesses is controllable based on the amount of current applied to the heater element.

According to an embodiment, the Joule heating is applied to the slider by applying electrical current to a thermo-resistive element constituent to the head slider. For example, the electrical current may be applied to an embedded contact sensor (ECS) element which is positioned very near the NFT element in the head slider and produces a protrusion substantially similar to that induced by the NFT during write operations, or may even be applied to the NFT element itself, according to embodiments.

The foregoing fabrication process may be performed on multiple head sliders simultaneously, such as on a row-bar of sliders, and may be applied prior to head overcoat deposition. Furthermore, electrical connections to the rows of sliders are typically already present for purposes of electrical lapping guides so any additional instrumentation of the wafer is unnecessary or minimal. Thus, a readily and efficiently manufacturable component is enabled for implementation into hard disk drives.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a method and apparatus for a recessed near field transducer in a heat-assisted magnetic recording head, for use in a hard disk drive, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
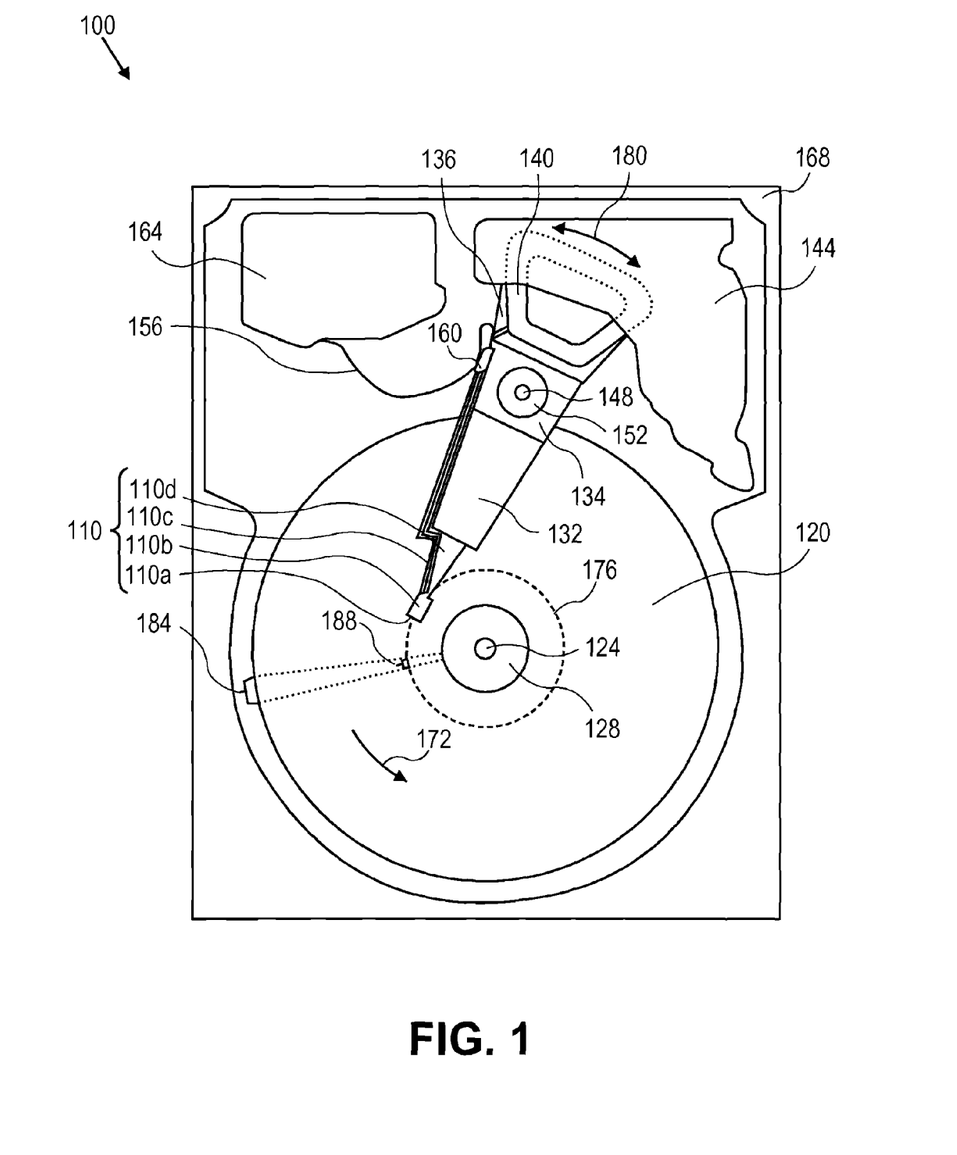
FIG. 1 is a plan view of an HDD, according to an embodiment of the invention.

Embodiments of the invention may be used in the context of the manufacturing and use of a magnetic writer for a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not shown) attached to the spindle 124 for rotating the media 120. The head 110a includes a write element and a read element for respectively writing and reading information stored on the media 120 of the HDD 100. The media 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks (not shown) arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Heat-Assisted Magnetic Recording Head

Figure 2:
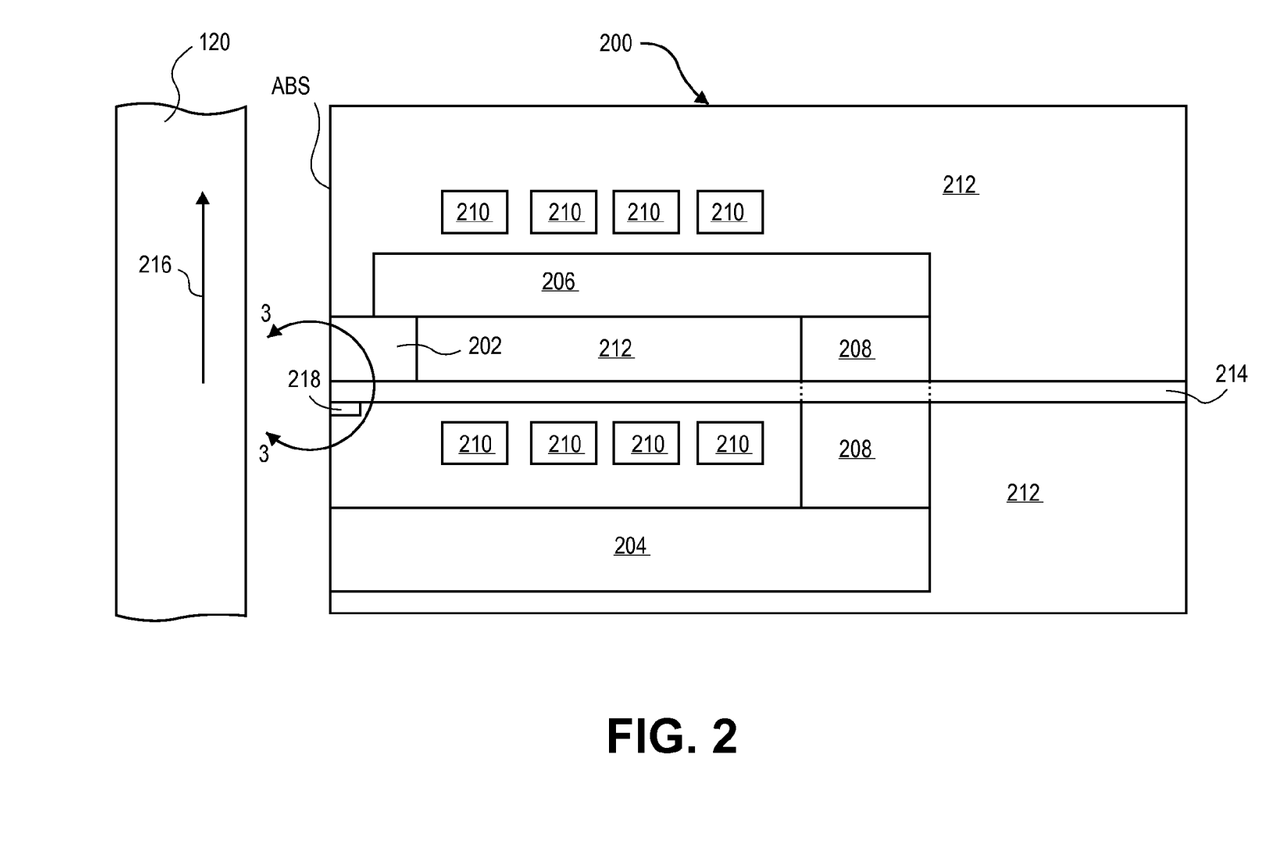
FIG. 2 is a cross sectional view of a HAMR magnetic write head, according to an embodiment of the invention.

FIG. 2 is a cross sectional view of a HAMR magnetic write head, according to an embodiment of the invention. With reference now to FIG. 2, a write head 200 is described, which may be incorporated into a magnetic head such as head 110a (FIG. 1). The write head 200 can include a write pole 202 that extends to an air bearing surface (ABS) and a magnetic return pole 204. The return pole 204 has a cross section at the ABS that is larger than the cross section of the write pole 202 at the ABS. The write pole 202 can be connected with a shaping layer 206 in a region removed from the ABS. A magnetic back gap layer 208 connects the shaping layer 206 with the return pole 204 in a region removed from the ABS, thereby magnetically connecting the write pole 202 with the return pole 204 and shaping layer 206 in a region removed from the ABS. The write pole 202, return pole 204, shaping layer 206 and back gap 208 are all constructed of a magnetic material, such as NiFe or CoFe. The write pole 202 is also constructed of a magnetic material and is preferably constructed of a lamination of layers of high magnetic moment material, such as CoFe.

An electrically conductive write coil 210, shown in cross section in FIG. 2, passes between the write pole 202 and the return pole 204 and may also pass beneath the write pole 202. The write coil 210 can be constructed of a non-magnetic, electrically conductive material such as Cu and can be embedded in a non-magnetic, electrically insulating material such as alumina 212.

With continued reference to FIG. 2, a heating assembly 214 can be provided adjacent to the write pole 202 for locally heating the magnetic media 120. For example, a plasmonic heating device may be implemented for heating assembly 214. The heating assembly 214 can pass through an opening within the back gap layer 208 so that it can extend beyond the back gap layer 208. The magnetic media 120 travels in a direction indicated by arrow 216 relative to the write head 202. Therefore, as can be seen, the heating assembly 214 is upstream from the write pole 202, or in other words is in a leading direction relative to the write pole 202. The heating assembly 214 locally heats the magnetic media 120 in a region just upstream from the write pole 202, which momentarily reduces the local coercivity of the magnetic media 120. This greatly facilitates writing to a magnetic media which has an otherwise too high coercivity to be written to. In order for the heating assembly 214 to effectively function, it must be located as close as possible to the write pole. In addition, the heating assembly 214 must heat only a very small area on the media 120 in order to avoid demagnetizing adjacent tracks of data or downstream data on the same track.

With continued reference to FIG. 2, a heater element 218 may be provided adjacent to the HAMR-based heating assembly 214, for locally heating the head slider. Heater element 218 is depicted in FIG. 2 positioned on the same side of the write pole 202 as is the HAMR-based heating assembly 214, just below the heating assembly 214. However, the location of the heater element 218 may vary from implementation to implementation and may be positioned, for example, on an opposing side of the write pole 202 as the heating assembly 214.

According to an embodiment, heater element 218 is implemented as an embedded contact sensor (ECS). Resistor temperature detector systems have been used to determine when the slider head makes physical contact with the magnetic-recording disk based upon the temperature of a thermo-resistive element, such as an ECS, embedded in the slider near the read/write head. ECS elements sense physical contact of the slider with the disk based on the ECS element's resistance, e.g., the amount of voltage across the element, which is affected by the temperature change caused by such physical contact. An ECS is a metallic strip located at the slider ABS and typically in close proximity to the write pole 202. Thus, an ECS is a good choice for use as a heater element 218, at least due to its proximity to the write pole 202 and associated HAMR heating assembly 214, which comprises a near field transducer as described in more detail herein. As mentioned, the location of the heater element 218 may vary from implementation to implementation. In the case of an ECS used as heater element 218, the position of the ECS may depend on the various functions for which it is used including the use of the ECS for sensing contact between slider and disk for flying height sensing and control, as well as use of the ECS for pre-heating the NFT during slider fabrication as described herein.

Figure 3:
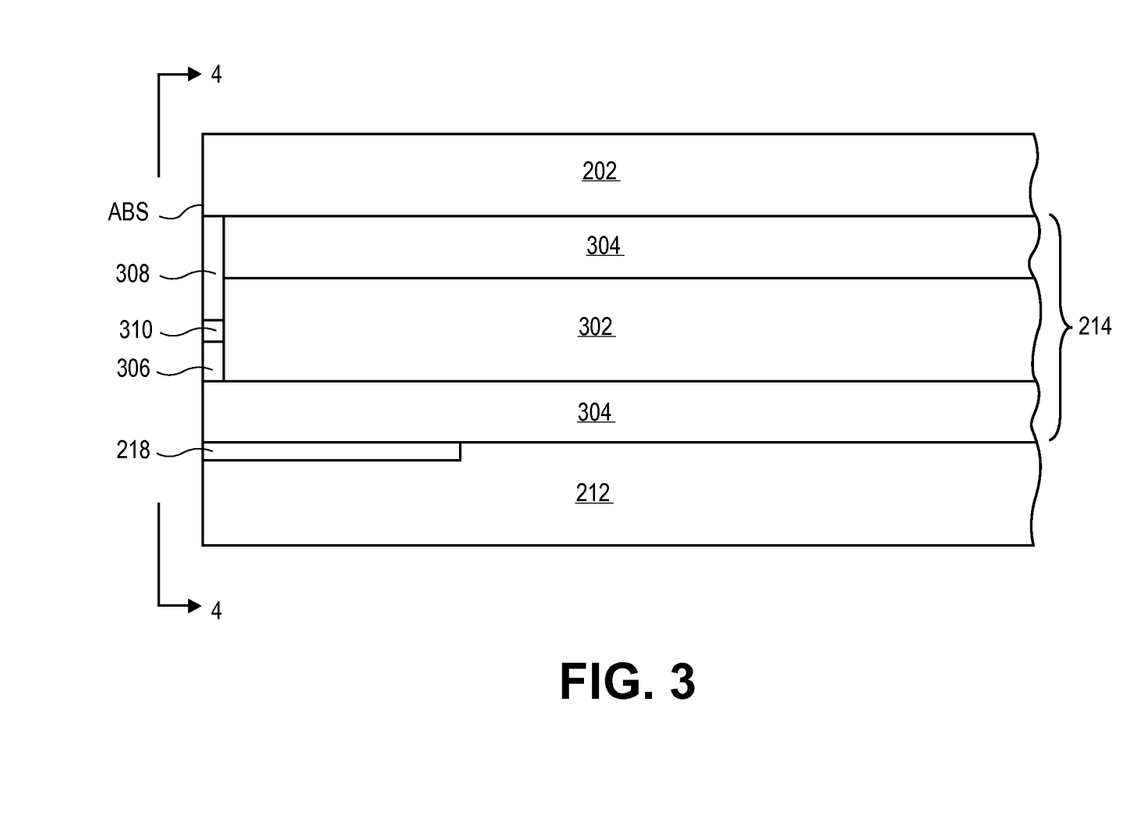
FIG. 3 is an enlarged view of a portion of the magnetic write head of FIG. 2 as taken from circle 3-3, according to an embodiment of the invention.

FIG. 3 is an enlarged view of a portion of the magnetic write head of FIG. 2 as taken from circle 3-3, according to an embodiment of the invention. FIG. 3 shows an enlarged view of a portion of a heating assembly 214, as seen from circle 3 of FIG. 2. The heating assembly 214 includes a light waveguide 302 surrounded by a cladding material 304, which can be a material such as alumina. The heating assembly 214 also includes a metal antenna 306 located at the ABS. A magnetic, metallic lip 308 may extend from the write pole 202 toward an aperture 310 formed between the magnetic lip 308 and the antenna 306. Heater element 218 is shown adjacent to and below the lower cladding material 304 of heating assembly 214. The antenna 306 and the aperture 310 may collectively form what is referred to as a near field transducer, or "NFT".

Laser light is incident on the waveguide cross-section at the flex side of the slider and the light is carried and delivered by the waveguide 302 at the antenna 306. When light travels through the waveguide 302, a plasmonic wave is formed at the junction between the antenna 306 and the aperture 310. Concentration of light energy leads to generation of a hot spot at a notch in the antenna 306. This hot spot is used to locally heat the magnetic medium 120 (FIG. 2) to temporarily lower the magnetic coercivity at that location. The hot spot heats the media 120 in an extremely focused and small area of the media, smaller and more focused than would be possible using other heating methods.

More detailed information about the structure and functionality of a thermally assisted magnetic write head employing an NFT can be found in U.S. Pat. No. 8,351,151 to Katine et al., which is incorporated by reference in its entirety for all purposes as if fully set forth herein.

Introduction

A portion of the optical power not converted into the focused optical power generates heat at the NFT and surrounding region. Thus, the aforementioned concentration of light energy leads to heating of the antenna 306, the aperture 310, and the magnetic lip 308, for example. The heat at the NFT and the surrounding portion of the slider may cause a localized protrusion of the region, which protrudes beyond the slider ABS.

Figure 4:
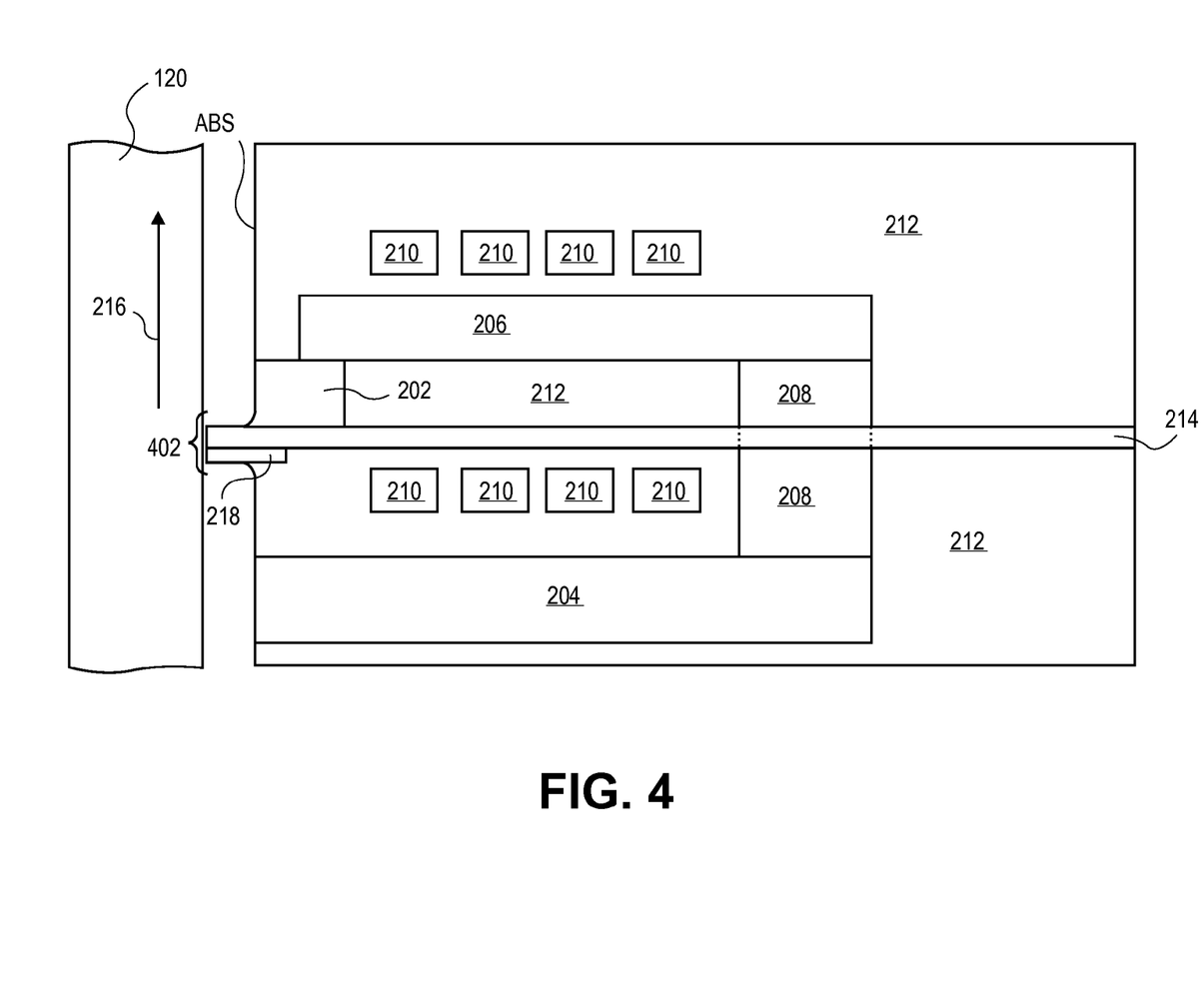
FIG. 4 is a cross sectional view of a HAMR magnetic write head, during a write operation, according to an embodiment of the invention.

FIG. 4 is a cross sectional view of a HAMR magnetic write head, during a write operation, according to an embodiment of the invention. FIG. 4 depicts a localized protrusion 402 of the region of the NFT during a write operation as heat is being applied to the disk 120 via the heating assembly 214. The depiction of the protrusion 402 in FIG. 4 is exaggerated, and is not necessarily to scale and shape, but is illustrative of localized heating and the resultant protrusion of slider materials that occurs during a write operation. Considering that the slider flies only a few nanometers above the magnetic recording media, such a heat-induced protrusion can result in damage to the NFT and damage to the recording media. Therefore, it is desirable to fabricate an NFT that is recessed into the body of the head slider at ambient temperature so that the NFT does not protrude beyond the ABS and possibly into the recording media in response to the localized heating that occurs during operation.

One approach to this problem involves using the optical power from a laser, either affixed to the slider or separate, to locally heat up the NFT to cause a protrusion that can be removed during pre-polishing. Another approach is to use an appropriate differential ion milling process during slider row-level fabrication to recess the NFT. However, both approaches have shortcomings. For example, using laser light to heat the NFT region is a complicated procedure at the slider level, e.g., having to instrument, align and calibrate each slider with a laser light source at a certain position in the fabrication process, and the heat generated by the laser for this purpose could damage the slider overcoat. Further, the ion milling approach is a rather coarse procedure that would not necessarily recess the NFT to an optimal, operational condition.

Methods for Manufacturing a HAMR Head Slider

Figure 5:
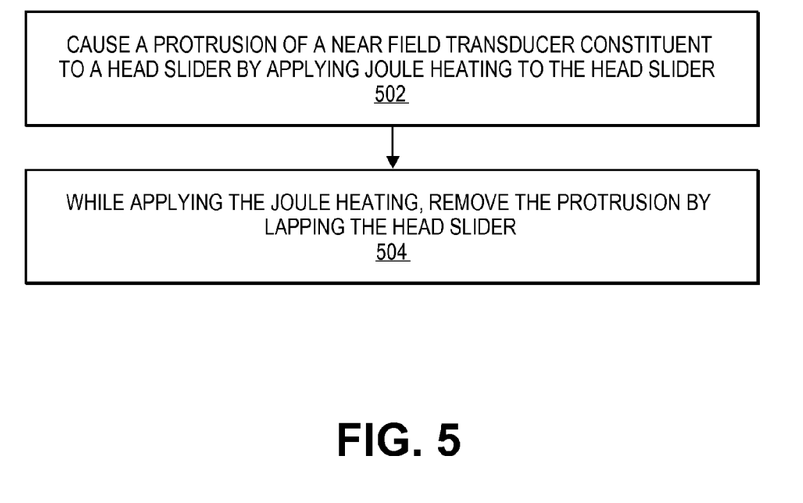
FIG. 5 is a flow diagram illustrating a process for manufacturing a recessed near field transducer in a HAMR head, according to an embodiment of the invention.

FIG. 5 is a flow diagram illustrating a process for manufacturing a recessed near field transducer in a HAMR head, according to an embodiment of the invention. Having introduced the concept of a recessed NFT, a method for manufacturing such a component is now described with reference to FIG. 5.

At block 502, Joule heating is applied to a head slider to cause a protrusion of a near field transducer that is constituent to the head slider. For example, Joule heating is applied to the slider via heater element 218 (FIG. 2). Joule heating, also referred to as resistive heating, is the process by which the passage of an electric current through a conductor releases heat in proportion to the amount of applied current. As mentioned, an ECS is a good choice for use as a heater element 218 in part due to its proximity to the write pole 202 (FIG. 2) and associated HAMR heating assembly 214 (FIG. 2) and constituent NFT. Furthermore, it has been determined that an ECS-induced protrusion is substantially similar to the protrusion induced by the NFT during operation of heating assembly 214, such as protrusion 402 (FIG. 4).

According to an embodiment, a heater element other than an ECS may be implemented for use as heater element 218 (FIG. 2). For example and according to an embodiment, the antenna 306 may be used to perform the function of heater element 218, which is to cause an "operating NFT" type of protrusion (e.g., protrusion 402 of FIG. 4) of the head slider in response to application of Joule heating thereto.

At block 504, while applying the Joule heating the protrusion is removed by conventional lapping of the head slider. Thus, when the Joule heating is removed, the NFT materials are now recessed at ambient temperature because the materials corresponding to the Joule-heating-applied protrusion were lapped off during the lapping process of block 504, as depicted in FIG. 6.

Figure 6:
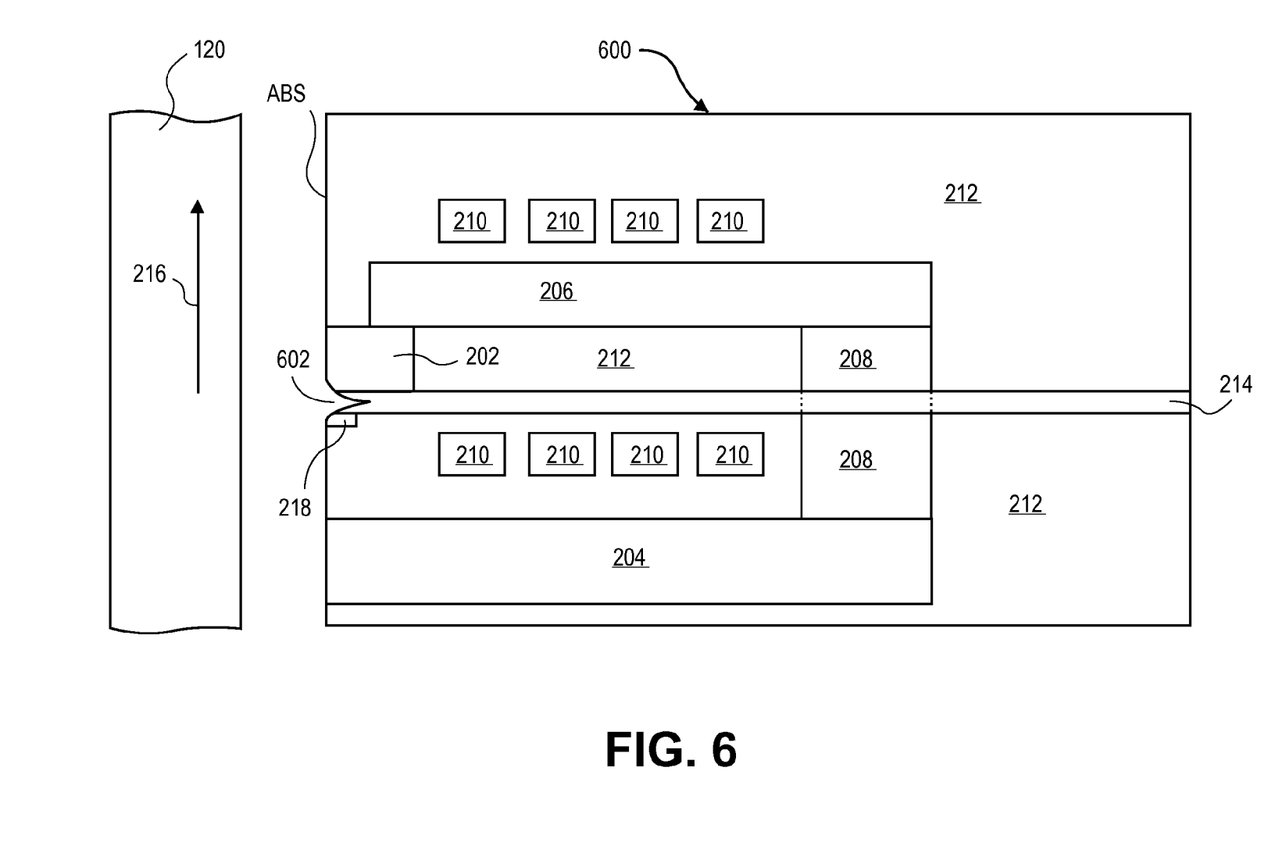
FIG. 6 is a cross sectional view of a HAMR magnetic write head at ambient temperature, according to an embodiment of the invention.

FIG. 6 is a cross sectional view of a HAMR magnetic write head 600 at ambient temperature, according to an embodiment of the invention. FIG. 6 depicts a recessed NFT 602 region of the magnetic write head 600, at ambient temperature, after the process of FIG. 5 is performed. Similarly to the protrusion 402 (FIG. 4), the depiction of the recessed NFT 602 in FIG. 6 is not necessarily to scale and shape but is illustrative. Thus, a HAMR magnetic write head 600 having a recessed NFT fabricated as described herein, during HAMR operation when optical power is being applied to the disk via the heating assembly 214 including the NFT, would transition to a shape close to the magnetic write head 200 of FIG. 2, where the NFT is substantially flush with the ABS.

According to an embodiment, the amount of protrusion induced by applying Joule heating (block 502) and, likewise, the amount of recess of the NFT region that can be obtained, can be controlled to a fine degree by varying the amount of current applied to the heater element 218. Furthermore, although the shape of the recessed NFT 602 of FIG. 6 is merely illustrative, a real HAMR head slider comprising a recessed NFT would have a recession profile that is indicative that the slider had undergone lapping while applying Joule heating to a heater in close proximity to the NFT. That is, based on the recession profile (e.g., the shape and location of the recession), one could determine what slider component was the source of the heat and from there could determine what type of heating was actually applied to the slider during the lapping process.

Furthermore, and according to an embodiment, lapping of the slider while applying the Joule heating can be performed simultaneously on a plurality of sliders, such as on a row-bar of sliders. A row-bar of sliders is a row of sliders separated from a matrix of sliders fabricated on a substrate at the wafer level. Applying a process on all columns of a row-bar simultaneously, as opposed to on an individual slider, enables a more efficient slider manufacturing process.

Still further, the slider overcoat can be deposited after the process of FIG. 5 is performed, thus there is no risk of damaging the overcoat during the process. This is in contrast with the use of optical power because either the sliders are individually instrumented with the laser light source after the overcoat is deposited on the slider, thus risking overcoat removal and damage, or if a row-bar of sliders is instrumented with the laser light source then the overcoat would need to be deposited at the individual slider level, which would be expensive and impractical.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for manufacturing a heat-assisted magnetic recording (HAMR) head slider for a hard disk drive, the method comprising:
   causing a protrusion of a near field transducer constituent to said head slider by applying Joule heating by applying electrical current to a heater element constituent to said head slider; and
   while applying said Joule heating, removing said protrusion by lapping said head slider;
   wherein the amount of current applied to said heater element is varied to control the extent to which said near field transducer recesses into the body of said head slider at ambient temperature.

2. The method of claim 1, wherein applying said Joule heating comprises applying electrical current to thermo-resistive element constituent to said head slider.

3. The method of claim 2, wherein applying said Joule heating comprises applying said Joule heating to an embedded contact sensor (ECS) element constituent to said head slider.

4. The method of claim 1, wherein lapping said head slider while applying said Joule heating is performed simultaneously on a plurality of head sliders.

5. The method of claim 1, wherein lapping said head slider while applying said Joule heating is performed simultaneously on a row-bar of head sliders.

6. The method of claim 1, wherein applying said Joule heating comprises applying electrical current to said near field transducer.

7. The method of claim 1, further comprising:
   after applying said Joule heating and lapping, depositing an overcoat to said head slider.

8. A heat-assisted magnetic recording (HAMR) head slider comprising:
   a thermo-resistive element; and
   a recessed near field transducer (NFT) in close proximity to said thermo-resistive element and having a recession profile indicative that said head slider underwent lapping while applying Joule heating to said thermo-resistive element.

9. The HAMR head slider of claim 8, wherein said NFT has a recession profile indicative that said lapping removed an NFT protrusion produced by said Joule heating.

10. The HAMR head slider of claim 8, wherein said thermo-resistive element is an embedded contact sensor comprising a metallic strip located at an air bearing surface of said slider.

11. A hard disk drive, comprising:
   a heat-assisted magnetic recording head slider comprising:
      a magnetic writer,
      an embedded contact sensor comprising a metallic strip located at an air bearing surface of said slider, and
      a recessed near field transducer (NFT) in close proximity to said embedded contact sensor and having a recession profile indicative that said head slider underwent lapping while applying Joule heating to said embedded contact sensor;
   a magnetic-recording disk rotatably mounted on a spindle; and
   a voice coil motor configured to move said head slider to access portions of said magnetic-recording disk.

12. The hard disk drive of claim 11,
   wherein said NFT has a recession profile indicative that said lapping removed an NFT protrusion produced by said Joule heating.

\* \* \* \* \*